Nov. 24, 1959   G. S. BAHRS   2,914,310
WEIGHING APPARATUS
Filed April 26. 1955   3 Sheets-Sheet 1
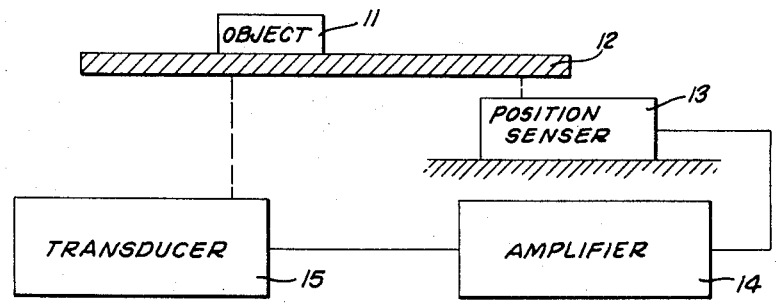
FIG_1
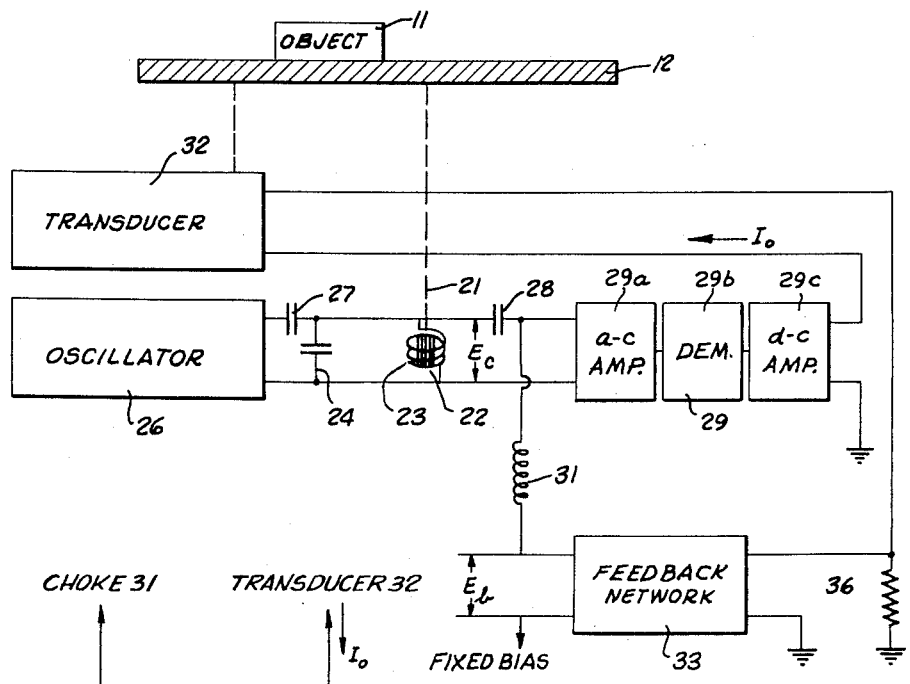
FIG_2
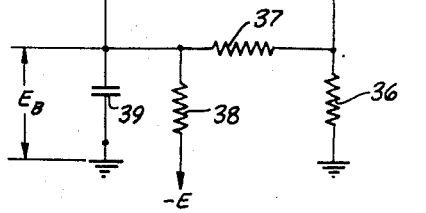
FIG_3
GEORGE S. BAHRS
INVENTOR.
BY
ATTORNEYS

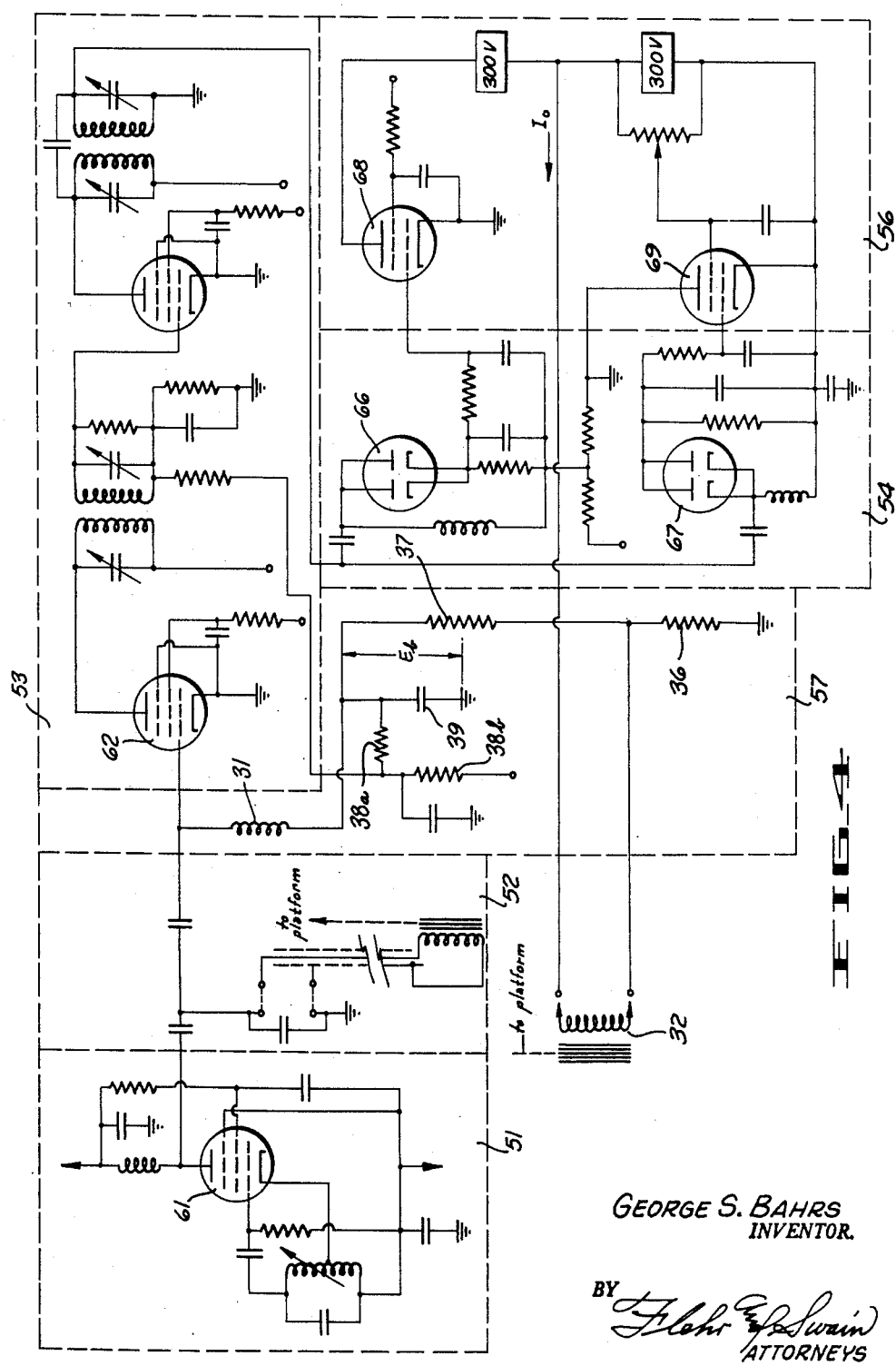

Nov. 24, 1959     G. S. BAHRS     2,914,310
WEIGHING APPARATUS
Filed April 26, 1955     3 Sheets-Sheet 3
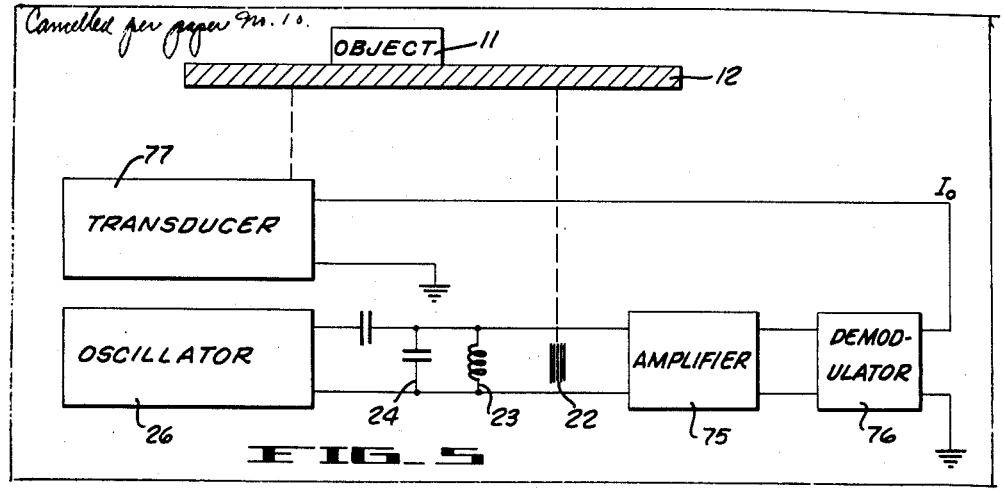
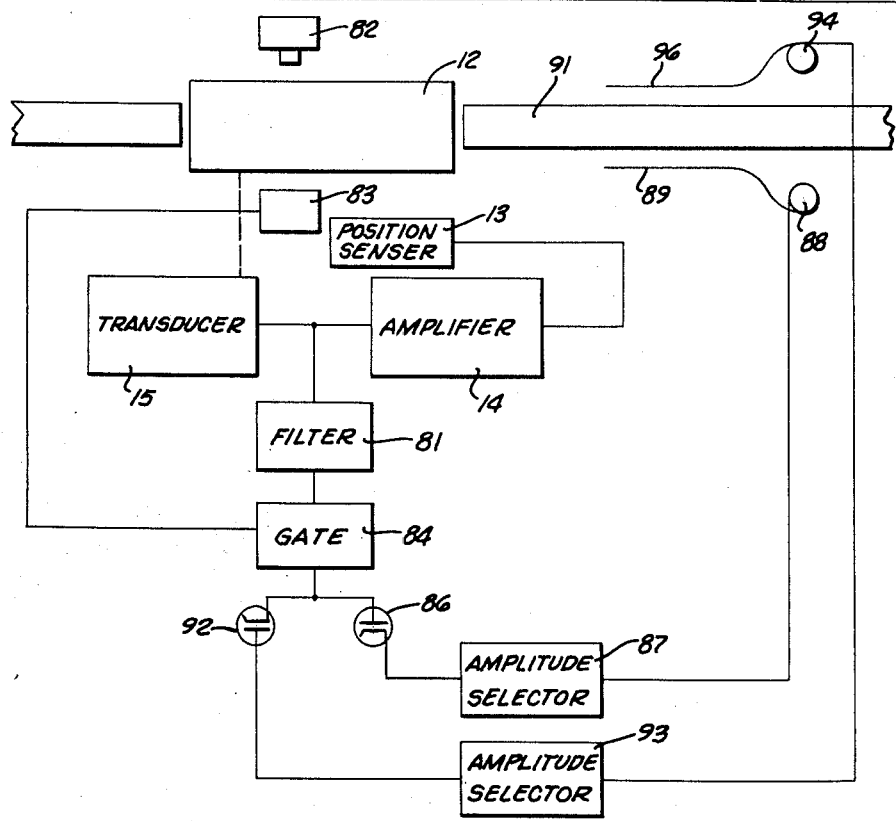
GEORGE S. BAHRS
INVENTOR.
ATTORNEYS

United States Patent Office 2,914,310
Patented Nov. 24, 1959

2,914,310

WEIGHING APPARATUS

George S. Bahrs, Palo Alto, Calif.

Application April 26, 1955, Serial No. 504,005

8 Claims. (Cl. 265—70)

This invention relates generally to weighing apparatus, and more particularly to electrical weighing apparatus.

Generally, so-called electrical weighing devices presently available employ a damped spring balanced scale. An electrical sensing device is employed to determine the position at which the scale reaches balance. Damping means, generally of the oil filled piston type are associated with the platform. As each package is placed on the scale platform the spring is stretched or strained and tends to oscillate about its equilibrium position. The damping means serve to dampen the oscillation and bring the platform rapidly to rest. Even with the best mechanical damping means available, the period of oscillations is relatively long. The time required to weigh an object is determined by the period of oscillation. The longer the time required for the oscillations to die out, the slower the rate at which objects can be weighed.

It is an object of the present invention to provide an improved electrical weighing apparatus.

It is another object of the present invention to provide weighing apparatus in which the platform movement is negligible.

It is another object of the present invention to provide weighing apparatus which employs electrical damping.

It is another object of the invention to provide electrical weighing apparatus in which the force which opposes the movement of the platform is proportional to platform velocity and displacement.

It is another object of the present invention to provide electrical apparatus in which the electrical characteristics may be varied to control damping.

It is a further object of the present invention to provide electrical weighing apparatus in which drift in the electrical circuit does not affect the calibration of the apparatus.

It is still a further object of the present invention to provide an electrical weighing apparatus capable of rapidly and accurately weighing objects.

Additional objects of the invention will appear from the following description in which the preferred embodiments have been set forth in detail in conjunction with the accompanying drawings.

Referring to the drawings:

Fig. 1 is a schematic diagram of weighing apparatus which incorporates my invention;

Figure 2 is a schematic diagram of another embodiment of weighing apparatus which incorporates my invention;

Figure 3 is a circuit diagram of the feedback network incorporated in the apparatus of Figure 2;

Figure 4 is a detailed circuit diagram of weighing apparatus which incorporates my invention; and Figure 5 is a schematic diagram of weighing apparatus which includes means for selective rejection of objects not having a predetermined weight.

Generally, my apparatus comprises means serving to develop an electrical signal which is proportional to the displacement of the weighing platform. The signal is applied to circuit means which provides an amplified output signal which is proportional to the displacement and rate of displacement of the weighing platform. The output of the circuit means is applied to an electromechanical transducing means which applies a restoring force to the platform whereby the platform is maintained at or near its equilibrium position and the platform movement is damped.

Referring particularly to Figure 1, the object 11 to be weighed is placed upon the platform 12. Position-sensing means 13 associated with the platform 12 develops an electrical signal, for example, a voltage, which is proportional to the displacement of the platform 12. Preferably, the position sensor 13 is constructed so as to introduce no friction. For example, it may comprise a stationary solenoid coil into which is inserted a powdered iron slug which moves with the platform. Vertical movement of the platform varies the penetration of the slug into the coil, thus changing its inductance. If an alternating current of constant amplitude is supplied to the coil, the amplitude of the alternating voltage across the coil is a measure of the platform displacement.

Another possible arrangement is to place the coil in a resonant circuit which is supplied by an alternating current of constant amplitude. Again the change in inductance is reflected by a proportional change in voltage across the resonant circuit. The latter method is preferable since a greater change in voltage will result for a given platform movement.

It is to be understood, of course, that other means may be employed to detect and electrically report the platform height, for example, differential transformers. A variety of units are also available which produce a change in capacitance rather than a change in inductance as previously described.

The electrical signal developed by the position senser 13 is fed to amplifying means 14. The amplification should be such that sufficient power is available to operate the electromechanical transducer 15, to be presently described. The transducer 15 serves to develop a force which opposes the movement of the platform. If the signal applied to the electromechanical transducer 15 has a component which is proportional to the velocity of the platform as well as a component which is proportional to its displacement, the platform will experience a force which is equivalent to that presented by a spring in conjunction with a viscous damping device.

The system which comprises the senser 13, amplifier 14 and the electromechanical transducer 15 should have a broad enough response to be capable of responding to changes in platform height occurring at frequencies which range from D.C. to several hundred cycles per second or more.

Since the position sensor 13 supplies a signal which is proportional to the platform displacement, the amplifier 14 should be designed to deliver an output signal which is proportional to both the displacement of the platform 12 and to its rate of displacement if electrical damping is desired. A novel carrier amplifier and demodulator 14 capable of producing an output signal which is proportional to the input and to the time rate of change of the input will be presently described.

Other types of amplifiers well known in the art may be employed, together with suitable circuits, to produce a signal which is proportional to displacement and to rate of displacement. For example, the voltage which is developed by the position senser may be an alternating current voltage having a relatively high frequency. The changes in amplitude of the input voltage will cause sidebands to appear on each side of the carrier (high frequency voltage). This voltage is applied to an amplifier which incorporates a notch rejection filter (bridged-T or similar type filter). The filter is designed to attenuate the sidebands less than the carrier frequencies. It is clear that the greater the rate of change of the input voltage (platform height), the further removed from the carrier frequency will be the resulting sidebands. Consequently the notch-rejection filter will attenuate these sidebands less and a proportionally greater output will result for these frequencies. Thus the output of the amplifier will have a component which is proportional to the rate of change of platform height.

A D.-C. amplifier may also be employed. As is well known, such amplifiers have an unbypassed cathode bias resistor. This gives rise to degenerative feedback and, consequently, to a reduction in gain of the amplifier. By bypassing the bias resistor by a capacitor of appropriate size, rapidly changing signals will be bypassed, thus reducing the degenerative feedback giving proportionally greater amplification to these signals than to the slowly varying signals. Thus, the output is proportional to both the change and to the rate of change of the input.

Many other types of amplifiers may be employed to produce an output which is proportional to an input, as well as to the rate of change of the input. It is to be understood that any such substitutions will not depart from the spirit or scope of this invention.

The electromechanical transducer 15 provides a force in response to the current supplied by the amplifying device. For example, the transducer may comprise a coil of many turns immersed in the magnetic field of a permanent magnet. A transducer of this type provides a force which is proportional to the applied current. A transducer which employs an iron armature and two electromagnets will be presently described.

Thus, the system described constitutes a positional servo-mechanism which tends to maintain the platform at equilibrium height. When a load is applied to the platform forcing it below the equilibrium height, the amplifier acting in conjunction with the position senser provides an output signal which is proportional to both the platform displacement and its rate of displacement. The amplified signal is applied to a transducer to develop a force which opposes the platform movement. The weight of the object of the platform is determined by observing the current or voltage applied to the transducer 15.

If the transducer displays a linear force-current relationship, the platform is subjected to a restoring force which is proportional to its displacement from equilibrium. This is exactly the same force displacement behavior displayed by a spring which obeys Hooke's law. If the transducer 15 also receives a component of current which is proportional to the platform velocity, the system experiences a force which is equivalent to viscous damping. Thus, the platform and positional servo-mechanism simulates a damped spring-mass oscillatory system. The period of oscillation depends upon the platform mass and amplifier gain. An increase in the amplifier gain leads to an increase in the equivalent spring constant and, thus, to an increase in frequency of oscillation. By properly adjusting the amplifier constants, the period of oscillation may be made much less than the allowed weighing period. The electrical damping may be made such that the oscillations decay substantially within a few cycles after the object is placed on the platform. Rapidly decaying oscillations can also be obtained with a non-linear transducer, e.g. one for which the force is proportional to a power of the applied current.

When the apparatus is used in a check-weighing operation, the quantity of interest is the amount by which the object departs from a "correct" weight. If the platform is counterweighted so that when the object is of "correct" weight, the platform requires no external force to maintain equilibrium position, thus no transducer current flows, then any change from this condition will result in an output current. By employing this exact counterweight system the accuracy demanded of the circuitry is made less severe. For example, if a ten ounce package is to be weighed without a counterweight it might require 100 ma. to maintain the platform at its equilibrium position. An error of $\frac{1}{10}$ ounce would change the current by 1 ma. This is 1% of the reading and very difficult to measure. If a counterweight is used the change in current for the same error in weight would be from zero to 1 ma. A suitable meter would permit readings of much smaller errors in weight.

Referring to the embodiment of my invention illustrated in Figure 2, the object to be weighed 11 is placed on the platform 12. The platform 12 is mechanically connected 21 to the iron core 22 inserted within the inductor 23. As the platform 12 is moved from its equilibrium position, the iron core is moved within the inductor 23.

The inductor 23 is connected in parallel with the capacitor 24 to form a resonant circuit. A high frequency constant current source 26 is connected to the resonant circuit. For example, the high frequency oscillator 26 is shown capacitively coupled at 27 to the resonant circuit. The circuit constants of the resonant circuit are so arranged that operation is confined to the linear portion of the resonance curve. Thus a voltage $E_c$ is developed which is proportional to the platform displacement. The amplitude of the output voltage $E_c$ is proportional to the displacement of the platform and has a frequency which corresponds to the oscillator frequency.

The resonant circuit is capacitively coupled at 28 to the amplifier 29a which is biased to operate class C. Thus the output of the amplifier is proportional to the voltage swing $E_c$ and to the bias voltage $E_b$ applied through the R-F choke 31.

The amplifier 29a is tuned to the frequency of operation of the oscillator. The signal $E_c$ applied to the amplifier has the oscillator frequency and sidebands which correspond to the amplitude modulation introduced by movement of the core 22 within the inductance 23. The frequency band of the amplifier is such that all of these signals are amplified.

The amplifier output is demodulated by the demodulator 29b. The demodulated signal is applied to the D.-C. amplifier 29c which develops the current $I_o$ which is proportional to both the input voltage $E_c$ and the bias voltage $E_b$. This current is applied to the transducer 32 which develops a force which is proportional to the current $I_o$.

The bias voltage $E_b$ has two components. One component which is a fixed bias supplied by an appropriate voltage supply and a negative feedback component which is supplied by the feedback network 33. The feedback network is such that the feedback is reduced as the frequency of the signal applied thereto increases. Thus when the amplifier output is changing rapidly due to a large rate of change of platform height, the negative feedback is reduced giving a greater output current $I_o$. This results in a greater force being developed by the transducer 32. As previously described this force is equivalent to viscous damping.

A suitable feedback network 33 is shown in Figure 3. The network comprises the resistors 36, 37, 38 and the capacitor 39. The capacitor 39 in the feedback network causes the output $I_o$ to be proportional not only to the platform height as measured from equilibrium but also to the platform vertical velocity. Any rapid change in the position of the platform causes a rapid increase or decrease in the voltage applied to the amplifier which results in an increase or decrease of the output current $I_o$ of the amplifier. Instantaneous changes are bypassed by the capacitor 39 and the negative feedback is reduced accordingly. Consequently, the output $I_o$ of the amplifier is increased. An increase in the output $I_o$ increases the force applied to the platform by the transducer.

In Figure 4, I have shown a detailed circuit diagram of a novel circuit which may be employed to carry out my invention. Generally the circuit comprises an electron coupled oscillator 51 which feeds into a tuned circuit 52, the inductance of which is varied by the displacement from equilibrium of the platform (not shown). The voltage $E_c$ appearing across the tuned circuit is applied to the grid of the first stage of a two stage intermediate frequency tuned amplifier 53. The amplifier 53 is tuned to the frequency of oscillation of the electron coupled oscillator 51 and has a band width which will accommodate the side bands introduced by the platform movement.

The output of the amplifier is fed into a demodulating circuit 54 which develops a balanced D.-C. signal proportional to the output of the intermediate frequency amplifier. The output of the demodulator 54 is fed into a balanced D.-C. amplifier 56. The output current $I_o$ of the D.-C. amplifier 56 is proportional to the variations of the intermediate frequency voltage applied to the detector and has a polarity such as to apply a current to the transducer which gives rise to a force which opposes the movement of the platform. A feedback network 57 of the type described with reference to Figure 3 superposes a feedback voltage upon the bias voltage applied to the input of the intermediate frequency amplifier through the R-F choke 31.

The oscillator 51 includes a pentode 61 operating in an electron coupled oscillator circuit. The circuit constants may be such that the frequency of oscillation is in the neighborhood of 500 kc. Since the pentode has an extremely high dynamic plate resistance, the oscillator may be viewed as a constant current source feeding the tuned circuit 52.

The two-stage intermediate frequency amplifier is tuned to the frequency of operation of the oscillator. A large bias is applied to the control grid of the first tube 62 through the R-F choke 31. The tube employed may be one that has a cut-off voltage in the neighborhood of a few volts negative. The voltage developed across the resonant circuit 52 is of the same magnitude as the bias voltage applied to the grid of the tube 62. Thus the angle of conduction of the tube 62 is very small. As a result, the output of the first stage is controlled by the amplitude of the voltage appearing across the resonant circuit 52 and the feedback voltage applied through the choke 31. Thus the output of the first stage is proportional to both $E_c$ and $E_b$. The second stage of the intermediate frequency amplifier further amplifies the signal which is then applied to the detector circuit 54.

The outputs of the detector tubes 66 and 67 are fed to the grids of the amplifier tubes 68 and 69 respectively. The amplifier tubes are essentially connected in push-pull. The grid of the amplifier tube 68 is biased in the neighborhood of $-60$ volts, while the control grid of the tube 69 is biased to zero. When the platform is at its equilibrium position the output of the amplifier is such that the voltages developed by the diodes 66 and 67 reduce the bias on the tube 68 to $-30$ volts and a signal of $-30$ volts is applied to the grid of the tube 69. Since the tubes 68 and 69 are connected in push-pull, the output $I_o$ will be zero. When the platform departs from its equilibrium position, the bias voltage on the tubes 68 and 69 will change in opposite directions whereby a current $I_o$ is applied to the transducer to restore the platform to its equilibrium position. A feedback circuit of the type described in conjunction with Figure 3 gives rise to a feedback signal which is proportional to the platform velocity.

Rather than operating the tubes 68 and 69 in push-pull it is also possible to employ the output of the tubes separately in a novel transducer. The transducer comprises an iron armature attached to the platform and an electromagnet above and one below the armature. The output of one of the tubes 68 and 69 is supplied to one of the electromagnets and the output of the other tube is supplied to the other electromagnet. Thus when an upward force is required the upper magnet is excited more than the lower magnet and vice versa. Thus, in effect I have provided a transducer which operates in push-pull.

The over-all amplifying-demodulating circuit functions in such as way as to provide an output current $I_o$ which is proportional to $E_b$ and $E_c$. Thus $$I_o = -G(E_c - E_b) \qquad (1)$$

where G is the mutual transconductance or transfer function—amps out/volts in.

As previously described, the voltage $E_c$ is very nearly proportional to the impedance offered by the parallel resonant circuit because of the fact that the oscillator 51 may be regarded as a constant current source.

The voltage $E_c$ is given by the equation $$E_c = Ay \qquad (2)$$

where $y$ is the platform height, and A is a constant of proportionality.

Substituting this into Equation 1 yields $$I_o = -G(Ay - E_b) \qquad (3)$$

If the feedback circuit resistor 37 exceeds the resistor 36 by nearly three orders of magnitude and the resistor 37 exceeds the resistor 38 by at least two orders of magnitude, and further assuming that the amplifier-demodulator has a large gain G in excess of 1000, it can be shown that the current $I_o$ developed is given by the following equation with an accuracy of 1%:

$$I_o = -R_{37}A\left(\frac{1}{R_{38}}(y - y_o) + C_{39}\frac{d(y - y_o)}{dt}\right) \qquad (4)$$

This equation gives the relationship between the amplifier output current $I_o$ and the platform height $y$.

The capacitor $C_{39}$ which is included in the feedback network causes the current $I_o$ to be proportional, not only to the platform change in height $y - y_o$ but also to the platform velocity $$\frac{d(y - y_o)}{dt}$$

as shown in Equation 4.

Let us define a constant F which relates the force in pounds developed by the transducer 57 to current in amps flowing through the coil. The coil is so arranged that the current flow in the direction shown results in an upward force on the platform. If the platform system and object to be weighed have a combined mass M, then the following differential equation arises from Newton's second law of motion which states that: The product of mass times acceleration for any body is equal to the algebraic sum of the forces acting on the body M.

$$M\frac{d^2(y - y_o)}{dt^2} = I_o F - W \qquad (5)$$

W is the error in the weight of the object to be weighed, i.e., the amount by which the actual weight departs from the "correct" weight. It is well to note that M and W bear no special relationship to each other in this system. M represents the equivalent mass of the platform, counterweight and object to be weighed; M is that mass which must be accelerated when the platform height $y$ is changed. W is the net downward force acting on the platform due to the departure of the object's weight from the "correct" value. Recalling that the counterweight may be so adjusted that W is zero when the object is of correct weight, we see that W may be positive for an overweight object and negative for an underweight object. The magnitude of the weight will be equal to the error in the object's weight. By combining Equations 4 and 5, and defining $k$ as $$\frac{FR_{37}A}{R_{38}}$$

and $s$ as $C_{39}FR_{37}A$ the following equation results:

$$M\frac{d^2(y-y_o)}{dt^2} + s\frac{d(y-y_o)}{dt} + k(y-y_o) = -W \quad (6)$$

Equation 6 is recognized as a differential equation for an object of mass M having effective weight W subject to the restoring force of a spring having a spring constant $k$ and experiencing damping proportional to $s$. For reasonably small values of $k$ (less than critical damping) the solution of the above equation takes the form of a damped sinusoid corresponding to the decaying harmonic oscillations displayed by an ordinary spring-mass-friction system after shock excitation.

The electronic system appears as a spring with an ideal viscous damper. The spring constant and damping factor are readily controlled over a virtually unlimited range merely by adjusting the circuit components of the electronic system.

Weighing apparatus was constructed as described and the electronic system was adjusted so that a two pound force on the platform caused a movement of one-half of one-thousandth of an inch. The natural period of free vibrations of the platform was approximately 100 cycles per second. The damping was easily adjusted in such a manner that the oscillations died out substantially within a few cycles after the initiating disturbance. Such disturbances were of the type provided by an object passing on to the weighing platform. The platform came substantially to rest within a period of approximately $\frac{5}{100}$ to $\frac{10}{100}$ of a second after the object had passed onto the platform. At this time, the net force acting on the platform was observed and gave an accurate indication of the error of the object's weight.

It is seen from the above equations that when the platform velocity and acceleration have decayed to a negligible value, Equation 5 becomes $W = I_0F$.

This equation is an extremely simple relationship between the current flowing in the active coil and the error in the object's weight. Thus it is seen that I have provided a circuit which gives the weight of an object, or the variation of the weight of the object, from a determined weight in terms of the current flowing through the electromechanical transducer. As previously described, the weight may be determined in terms of voltage or power if desired.

Referring to Figure 5, I have shown weighing apparatus which provides means for rejecting packages which do not meet a predetermined weight. Thus, the platform 12 is connected to a transducer 15 which provides the restoring force. A position sensor 13 of the type previously described serves to produce an output signal which is proportional to platform displacement. The amplifier 14 which may be one of the types previously described serves to provide an output current $I_0$ which is proportional to the platform displacement and platform velocity. A voltage $E_0$ is developed by the output current and this voltage is passed through a low pass filter 81. The filter 81 serves to attenuate fluctuations in voltage caused by vibrations and mechanical disturbances in the system. The signal is fed into a gate which is opened by a signal produced by suitable photoelectric means 83 each time an object interrupts the light beam produced by the light source 82. If the package is overweight, the voltage $E_0$ developed is positive and the diode 86 conducts. The amplitude selector 87 will pass a signal to the reject mechanism 88 if the amplitude of the positive signal exceeds the predetermined amount. When the rejection mechanism 88 is activated, the arm 89 swings in the path of the conveyor belt 91 and causes the package to be discharged from the belt.

Similarly, when the packages are underweight, a negative signal will appear at the diode 92. The amplitude selector 93 will pass a signal of predetermined amplitude to the reject mechanism 94. When a signal is passed to the reject mechanism 94, the arm 96 is moved to reject the oncoming package.

In certain applications, mechanical vibrations adjacent the weighing apparatus will cause the senser to have an output signal which has A.-C. noise voltage superimposed thereon. This signal will be amplified and the output of the amplifier will be such as to cause the electromechanical transducer to apply a force which will fluctuate about the mean value. In electrical terms, we might state that the D.-C. component proportional to the weight has superimposed thereon an A.-C. voltage which is caused by the mechanical vibrations.

As previously described, this noise may be substantially eliminated by means of a low pass filter. If a D.-C. voltage including a noise is applied to a low pass filter for a reasonable period of time, a D.-C. output voltage will emerge with the noise removed. However, it is more satisfactory to provide means for actually averaging the signals rather than eliminating the noise voltage. The time average of the force required to support the objects substantially at rest will give an accurate weight of the object. This averaging process may be readily performed by passing the signal $E_o$ which is proportional to the current $I_o$ flowing through the active coil of the transducer through an electronic gate which opens for a specified time. The gate will feed the signal to an electronic integrating circuit, for example, a Miller integrator. Suitable means open the gate during a predetermined period of time when the package is traveling along the platform. The output of the integrator will then give a signal which is proportional to the average weight of the package over the period of time during which the gate is open.

Although my weighing apparatus has been described with reference to weighing, and to rejection apparatus, it is obvious that it may be used in many other applications. For example, the weighing device may be used at a filling station to stop the filling operation of a package at a particular time to ensure the prescribed amount of product is placed within the container. Another possible use might be as a laboratory scale where the sensitivity may be made arbitrarily large and the weighing time arbitrarily small by varying the components in the electrical circuit. By attaching an appreciable mass to the platform of the device, it may be used as an accelerometer. The weight range of the device may be extended by appropriate mechanical linkage and a possible application in that instance would be to the rapid weighing of railroad freight cars or trucks moving at a high rate of speed over a weighing platform.

Thus, it is seen that I have provided weighing apparatus which is capable of weighing objects at a rapid rate of speed and in which the oscillations due to the object traveling onto the weighing platform are electronically damped. Further, the apparatus described does not depend upon measuring the displacement of the platform, but depends upon measuring the current required to maintain the platform at or near equilibrium position. Changes in the position of the sensing device or drift in the amplifier do not affect the calibration of the weighing apparatus.

I claim:

1. In weighing apparatus of the type which includes a platform for receiving objects to be weighed, means serving to develop a first electrical signal which is proportional to the platform displacement, amplifying means connected to receive said signal, said amplifying means including a feedback network serving to develop a feedback signal which is attenuated by an amount proportional to the time rate of change of the signal whereby the output of said amplifier is proportional to the sum of the displacement and rate of displacement of said platform, an electromechanical transducing means adapted to receive said signal and serving to provide a restoring force to said platform whereby the platform is rapidly restored to its equilibrium position.

2. In weighing apparatus of the type which includes a platform adapted to receive the objects to be weighed, variable impedance means connected to the platform, the impedance of said means being variable in response to the platform displacement, an oscillator serving to supply an alternating current signal to said variable impedance means, said impedance means serving to amplitude modulate the signal in accordance with the platform displacement, amplifying means connected to receive the amplitude modulated signal and to develop an output signal, a feedback circuit connected to said amplifying means and serving to develop a feedback voltage which is attenuated by an amount proportional to the rate of change of said signal, and electromechanical transducing means adapted to receive said output signal and serving to provide a restoring force to said platform.

3. In weighing apparatus of the type which includes a platform adapted to receive objects to be weighed, means serving to develop a constant frequency alternating current signal which has an amplitude proportional to the platform displacement, an A.-C. amplifier serving to receive and amplify said signal, demodulating means connected to receive the output of the amplifier and serving to develop a balanced D.-C. signal which is proportional to the output of the amplifier, a balanced direct current amplifier serving to receive said D.-C. signal and to amplify the same, and negative feedback means connected to receive the output of said D.-C. amplifier and serving to feed a signal to the input of the A.-C. amplifier which is reduced as the rate of change of the signal applied thereto increases whereby the output signal from said D.-C. amplifier is proportional to both the platform displacement and to rate of change of platform displacement, an electromechanical transducing means adapted to receive said output D.-C. signal and serving to provide a restoring force to the platform.

4. In weighing apparatus of the type which includes a platform for receiving objects to be weighed, means serving to develop a first electrical signal which is proportional to platform displacement, amplifying means connected to receive said signal, a feedback network connected in said amplifying means, said feedback network serving to develop a feedback signal which is attenuated by an amount proportional to the rate of the change of said first signal whereby the output of said amplifier is proportional to sum of the displacement and rate of displacement of the platform, electromechanical transducing means adapted to receive the output of said amplifier and serving to provide a restoring force to said platform whereby the platform is rapidly restored to its equilibrium position, and means serving to indicate the magnitude of amplifier output and serving to provide an indication of the weight of the object placed on the platform.

5. In weighing apparatus of the type which includes a platform adapted to receive the objects to be weighed, means serving to develop a constant frequency alternating current signal which has an amplitude proportional to the platform displacement, an alternating current amplifier serving to receive and amplify said signal, demodulating means connected to receive the output of said amplifier and serving to develop a D.-C. signal which is proportional to the output of the amplifier, a D.-C. amplifier serving to receive said D.-C. signal and amplify the same, negative feedback means connected to receive the output of said D.-C. amplifier and provide a negative feedback signal to the input of said A.-C. amplifier, said feedback means providing a feedback signal which is reduced as the rate of change of the signal applied thereto increases, and means connected to receive the output of said D.-C. amplifier and serving to provide a restoring force to said platform.

6. In weighing apparatus of the type which includes a platform adapted to receive the objects to be weighed, means serving to develop a constant frequency alternating current signal which has an amplitude proportional to the platform displacement, an A.-C. amplifier serving to receive and amplify said signal, demodulating means connected to receive the output of the amplifier and serving to develop a balanced D.-C. signal which is proportional to the output of the amplifier, a balanced direct current amplifier serving to receive said D.-C. signal and to amplify the same, a negative feedback circuit comprising a resistive-capacitive network with the resistance elements serving to provide a feedback signal which stabilizes the gain of the system and the capacitive elements serving to attenuate the feedback by an amount proportional to the time rate of change of the ouput signal connected to received the output of the D.-C. amplifier and serving to feed a signal to the input of the amplifier, and electromechanical transducing means adapted to receive said output D.-C. signal and serving to provide the restoring force to the platform.

7. In weighing apparatus of the type which includes a platform adapted to receive the objects to be weighed, means serving to develop a constant frequency alternating current signal which has an amplitude proportional to the platform displacement, an alternating current amplifier serving to receive and amplify said signal, demodulating means connected to receive the output of said amplifier and serving to develop a D.-C. signal which is proportional to the output of the amplifier, a D.-C. amplifier serving to receive said D.-C. signal and to amplify the same, negative feedback means comprising a resistive-capacitive network connected to receive the output of said D.-C. amplifier and serving to provide a feedback signal to the input of the amplifier, the resistance elements of said feedback circuit serving to provide a feedback signal which stabilizes the gain of the system and the capacitive elements serving to attenuate the feedback by an amount proportional to the time rate of change of the output signal, and means connected to receive the output of said D.-C. amplifier and serving to provide a restoring force to said platform.

8. In weighing apparatus of the type which includes a platform adapted to receive the objects to be weighed, a variable impedance means connected to the platform, the impedance of said means being variable in response to the platform displacement, an oscillator serving to supply an alternating current signal to said variable impedance means, said impedance means serving to amplitude modulate the signal in accordance with the platform displacement, amplifying means connected to receive the amplitude modulated signal and to develop an output signal, a resistive-capacitive feeedback circuit connected to said amplifying means and serving to develop a negative feedback voltage for application to said amplifying means, said voltage being reduced as the rate of change of the amplifier output increases, and electromechanical transducing means adapted to receive said output signal and serving to provide a restoring force to said platform.

References Cited in the file of this patent

UNITED STATES PATENTS

| | | |
|---|---|---|
| 2,471,422 | Frost | May 31, 1949 |
| 2,519,668 | Konigsberg | Aug. 22, 1950 |
| 2,530,619 | Kliever | Nov. 21, 1950 |
| 2,620,657 | Stovall | Dec. 9, 1952 |
| 2,623,741 | Broekhuysen | Dec. 30, 1952 |
| 2,631,027 | Payne | Mar. 10, 1953 |
| 2,680,012 | Bozoian | June 1, 1954 |
| 2,685,200 | Slottow | Aug. 3, 1954 |
| 2,692,359 | Ehret | Oct. 19, 1954 |